United States Patent
Rode et al.

(10) Patent No.: US 12,036,643 B2
(45) Date of Patent: *Jul. 16, 2024

(54) SYSTEMS AND METHODS FOR PRELOADING A BEARING

(71) Applicant: TEMPER AXLE PRODUCTS CORPORATION, Fonda, NY (US)

(72) Inventors: John E. Rode, Fonda, NY (US); Sean E. Strait, Fort Plain, NY (US)

(73) Assignee: Temper Axle Products Corporation, Fonda, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/583,819

(22) Filed: Jan. 25, 2022

(65) Prior Publication Data

US 2022/0143795 A1 May 12, 2022

Related U.S. Application Data

(60) Continuation of application No. 16/706,024, filed on Dec. 6, 2019, now Pat. No. 11,247,319, which is a
(Continued)

(51) Int. Cl.
*B25B 27/06* (2006.01)
*F16B 39/12* (2006.01)
(Continued)

(52) U.S. Cl.
CPC ............ *B25B 27/062* (2013.01); *F16B 39/12* (2013.01); *F16C 19/383* (2013.01);
(Continued)

(58) Field of Classification Search
CPC .. F16C 2229/00; F16C 35/063; F16C 35/078; F16C 43/04; B25B 27/064
See application file for complete search history.

(56) References Cited

U.S. PATENT DOCUMENTS

| | | |
|---|---|---|
| 518,328 A | 4/1894 | Oakey |
| 578,276 A | 3/1897 | Strauss |

(Continued)

FOREIGN PATENT DOCUMENTS

| | | |
|---|---|---|
| AU | 2006200842 A1 | 7/2006 |
| AU | 2007200331 A1 | 8/2007 |

(Continued)

OTHER PUBLICATIONS

"STEMCO Pro-Torq® Advanced Axle Spindle Nuts 09-571-0006," Instruction guide, Copyright Aug. 2003, 2 pages.
(Continued)

*Primary Examiner* — Christopher J Besler
(74) *Attorney, Agent, or Firm* — Heslin Rothenberg Farley & Mesiti P.C.; Nicholas Mesiti, Esq.; Victor A. Cardona, Esq.

(57) ABSTRACT

A system for providing a load on a bearing mounted to a shaft includes an attaching member releasably connectable to the shaft and a press mechanism in fluid communication with a source of fluid and configured to provide a compressive load to the bearing. The press mechanism includes a switch having a base and a piston in communication with the fluid such that an increase in a pressure of the fluid results in the piston extending upwardly from the base and a decrease in the pressure of the fluid results in the piston retracting toward the base. The switch includes a lower proximity sensor and a higher proximity sensor. The piston is configured to extend upwardly from the base past the lower proximity sensor and to trip the higher proximity sensor. The switch is configured to control the increase in the pressure in response to the piston tripping the higher proximity sensor.

8 Claims, 15 Drawing Sheets

Related U.S. Application Data continuation of application No. 15/975,402, filed on May 9, 2018, now Pat. No. 10,532,451, which is a continuation of application No. 15/661,808, filed on Jul. 27, 2017, now Pat. No. 9,987,732, which is a division of application No. 15/071,753, filed on Mar. 16, 2016, now Pat. No. 9,764,453.

(51) Int. Cl.
*F16C 19/38* (2006.01)
*F16C 35/063* (2006.01)
*F16C 35/067* (2006.01)
*F16C 35/078* (2006.01)
*F16C 43/04* (2006.01)
*B23P 19/027* (2006.01)

(52) U.S. Cl.
CPC .......... *F16C 35/063* (2013.01); *F16C 35/067* (2013.01); *F16C 35/078* (2013.01); *B23P 19/027* (2013.01); *B25B 27/064* (2013.01); *F16C 43/04* (2013.01); *F16C 2229/00* (2013.01)

(56) References Cited

U.S. PATENT DOCUMENTS

| | | |
|---|---|---|
| 1,352,643 A | 9/1920 | Young |
| 1,366,273 A | 1/1921 | Nettlefold |
| 1,373,489 A | 4/1921 | Cochran |
| 1,384,655 A | 7/1921 | Allmon |
| 1,440,938 A | 1/1923 | Sieroslawski |
| 1,755,807 A | 4/1930 | Boles |
| 1,758,515 A | 5/1930 | Heiermann |
| 1,813,640 A | 7/1931 | Rossetti |
| 2,301,786 A | 11/1942 | Millermaster |
| 2,426,219 A | 8/1947 | Jackson |
| 2,532,141 A | 11/1950 | Barkan et al. |
| 2,553,620 A | 5/1951 | Yeazell |
| 2,755,698 A | 7/1956 | Wurzel |
| 2,762,112 A | 9/1956 | Kylen |
| 2,769,360 A | 11/1956 | Cottrell |
| 2,813,732 A | 11/1957 | Hird |
| 3,144,909 A | 8/1964 | Hart et al. |
| 3,241,409 A | 3/1966 | Raptis |
| 3,316,952 A | 5/1967 | Hollinger |
| 3,390,445 A | 7/1968 | Sova, Sr. |
| 3,464,474 A | 9/1969 | Jansen |
| 3,480,300 A | 11/1969 | Jeffrey et al. |
| 3,522,830 A | 8/1970 | Blizard |
| 3,566,721 A | 3/1971 | Nockleby |
| 3,581,609 A | 6/1971 | Greenwood |
| 3,620,108 A | 11/1971 | Door |
| 3,662,449 A | 5/1972 | Hashimoto |
| 3,664,226 A | 5/1972 | Gonzalez |
| 3,678,981 A | 7/1972 | Heyworth |
| 3,705,524 A | 12/1972 | Greenwood |
| 3,742,568 A | 7/1973 | Hahlbeck |
| 3,762,455 A | 10/1973 | Anderson, Jr. |
| 3,844,323 A | 10/1974 | Anderson, Jr. |
| 3,986,750 A | 10/1976 | Trent et al. |
| 4,004,338 A | 1/1977 | Breitbach |
| 4,019,824 A | 4/1977 | Percy |
| 4,048,897 A | 9/1977 | Price, Jr. |
| 4,054,999 A | 10/1977 | Harbottle |
| 4,210,372 A | 7/1980 | Mcgee et al. |
| 4,305,438 A | 12/1981 | Spinosa et al. |
| 4,436,468 A | 3/1984 | Ozaki et al. |
| 4,476,750 A | 10/1984 | Murphy |
| 4,593,924 A | 6/1986 | Cabeza |
| 4,642,866 A | 2/1987 | Murtaugh |
| 4,689,865 A | 9/1987 | Chamblee |
| 4,812,094 A | 3/1989 | Grube |
| 4,958,941 A | 9/1990 | Imanari |
| 4,971,501 A | 11/1990 | Chavez |
| 5,007,313 A | 4/1991 | Jeromson, Jr. et al. |
| 5,011,306 A | 4/1991 | Martinie |
| 5,058,424 A | 10/1991 | O'Hara |
| 5,070,621 A | 12/1991 | Butler et al. |
| 5,125,156 A | 6/1992 | Witte |
| 5,129,156 A | 7/1992 | Walker |
| 5,180,265 A | 1/1993 | Wiese |
| 5,251,995 A | 10/1993 | Chi |
| 5,348,349 A | 9/1994 | Sloane |
| 5,349,736 A | 9/1994 | Rubino et al. |
| 5,362,111 A | 11/1994 | Harbin |
| 5,366,300 A | 11/1994 | Deane et al. |
| 5,402,560 A | 4/1995 | Rode |
| 5,442,854 A | 8/1995 | Koltookian et al. |
| 5,533,849 A | 7/1996 | Burdick |
| 5,535,517 A | 7/1996 | Rode |
| 5,542,167 A | 8/1996 | Nakamoto |
| 5,573,311 A | 11/1996 | Clohessy |
| 5,597,058 A | 1/1997 | Ewer |
| 5,749,386 A | 5/1998 | Samuel, Jr. |
| 5,779,419 A | 7/1998 | Kellström et al. |
| 5,877,433 A | 3/1999 | Matsuzaki et al. |
| 5,882,044 A | 3/1999 | Sloane |
| 5,934,853 A | 8/1999 | Junkers |
| 6,042,273 A | 3/2000 | Thrasher |
| 6,058,767 A | 5/2000 | Calvin |
| 6,065,920 A | 5/2000 | Becker et al. |
| 6,095,735 A | 8/2000 | Weinstein et al. |
| 6,135,642 A | 10/2000 | Burch |
| 6,145,417 A | 11/2000 | Bates et al. |
| 6,186,032 B1 | 2/2001 | Raines |
| 6,257,105 B1 | 7/2001 | Lin |
| 6,286,374 B1 | 9/2001 | Kudo et al. |
| D458,099 S | 6/2002 | Ruszczyk |
| 6,415,489 B1 | 7/2002 | Martins et al. |
| 6,471,774 B1 | 10/2002 | Krueger |
| 6,520,710 B2 | 2/2003 | Wells |
| 6,598,500 B1 | 7/2003 | Chivington |
| 6,601,503 B2 | 8/2003 | Scholzig et al. |
| 6,622,397 B1 | 9/2003 | Knoble |
| 6,637,297 B1 | 10/2003 | Mlynarczyk |
| 6,665,918 B1 | 12/2003 | Williams |
| 6,736,544 B1 | 5/2004 | DeWald |
| 6,749,386 B2 | 6/2004 | Harris |
| 6,783,137 B2 | 8/2004 | Nagreski et al. |
| 6,857,665 B2 | 2/2005 | Vyse et al. |
| 6,886,227 B1 | 5/2005 | Hedrick |
| 6,971,802 B2 | 12/2005 | Vezina |
| 6,976,816 B2 | 12/2005 | Slesinksi et al. |
| 6,976,817 B1 | 12/2005 | Grainger |
| 6,983,677 B1 | 1/2006 | Engel |
| 6,988,832 B2 | 1/2006 | DeWachter et al. |
| 6,993,852 B2 | 2/2006 | Russell et al. |
| 7,055,413 B1 | 6/2006 | Wang |
| 7,194,936 B2 | 3/2007 | Engel et al. |
| 7,226,259 B2 | 6/2007 | Harris |
| 7,270,509 B2 | 9/2007 | Disantis et al. |
| 7,303,367 B2 | 12/2007 | Rode |
| 7,343,836 B1 | 3/2008 | Ward |
| 7,346,985 B1 | 3/2008 | Strait |
| 7,389,579 B2 | 6/2008 | Rode |
| 7,428,779 B2 | 9/2008 | Smith et al. |
| 7,448,301 B1 | 11/2008 | Cronin |
| 7,559,135 B2 | 7/2009 | Rode |
| 7,625,164 B2 | 12/2009 | Rode |
| 7,757,586 B2 | 7/2010 | Winker et al. |
| 7,927,052 B1 | 4/2011 | Varden |
| 8,006,573 B1 | 8/2011 | Rode |
| 8,016,531 B2 | 9/2011 | White et al. |
| 8,172,496 B2 | 5/2012 | Vile et al. |
| 8,292,373 B2 | 10/2012 | Rieger et al. |
| 8,316,530 B2 | 11/2012 | Rode |
| 8,328,486 B2 | 12/2012 | Cox |
| 8,347,471 B2 | 1/2013 | Wang |
| 8,359,733 B2 | 1/2013 | Rode |
| 8,534,770 B2 | 9/2013 | White |
| 8,650,757 B2 | 2/2014 | Rode |
| D706,104 S | 6/2014 | Mooney |
| 8,904,646 B2 | 12/2014 | Rode |

(56) References Cited

U.S. PATENT DOCUMENTS

| | | |
|---|---|---|
| 8,919,227 B2 | 12/2014 | Tseng |
| 8,961,090 B2 | 2/2015 | Rode |
| 9,156,150 B2 | 10/2015 | Wang |
| 9,200,672 B2 | 12/2015 | Rode |
| 9,200,673 B2 | 12/2015 | Rode |
| 9,217,461 B2 | 12/2015 | Rode et al. |
| 9,566,699 B1 | 2/2017 | Rode et al. |
| 9,574,612 B2 | 2/2017 | Rode |
| 9,574,962 B2 | 2/2017 | Preuss et al. |
| 9,587,667 B2 | 3/2017 | Rode et al. |
| 9,599,164 B1 | 3/2017 | Rode et al. |
| 9,618,049 B2 | 4/2017 | Rode |
| 9,651,094 B2 | 5/2017 | Rode |
| D789,169 S | 6/2017 | Rode et al. |
| 9,764,453 B1* | 9/2017 | Rode ................. F16C 35/078 |
| 9,797,441 B2 | 10/2017 | Rode |
| 9,850,943 B1 | 12/2017 | Rode |
| 9,908,223 B2* | 3/2018 | Rode ................. F16B 39/12 |
| 9,909,609 B2 | 3/2018 | Rode et al. |
| 9,987,732 B2* | 6/2018 | Rode ................. F16C 35/078 |
| 10,100,872 B1* | 10/2018 | Rode ................. F16B 21/183 |
| 10,532,451 B2* | 1/2020 | Rode ................. F16C 35/078 |
| 11,247,319 B2* | 2/2022 | Rode ................. B25B 27/062 |
| 2004/0089113 A1 | 5/2004 | Morgan |
| 2014/0130343 A1* | 5/2014 | Rode ................. F16C 41/008 29/724 |
| 2014/0290065 A1 | 10/2014 | Rode |
| 2015/0027569 A1* | 1/2015 | Preuss ................. F15B 20/00 137/557 |
| 2017/0268572 A1 | 9/2017 | Rode et al. |
| 2017/0326714 A1 | 11/2017 | Rode et al. |
| 2018/0045244 A1 | 2/2018 | Rode |

FOREIGN PATENT DOCUMENTS

| | | |
|---|---|---|
| AU | 2007234534 A1 | 12/2007 |
| AU | 2008201252 A1 | 4/2008 |
| AU | 2011204889 A1 | 8/2011 |
| CA | 2576337 A1 | 7/2007 |
| CA | 2863789 A1 | 7/2007 |
| CA | 2993836 A1 | 7/2007 |
| CA | 2537611 A1 | 8/2007 |
| CA | 2704865 A1 | 12/2010 |
| CN | 102699875 A | 10/2012 |
| DE | 555123 C | 7/1932 |
| DE | 1962186 A1 | 6/1970 |
| DE | 3905385 A1 | 8/1990 |
| DE | 102007005160 A1 | 8/2007 |
| DE | 102006011122 A1 | 9/2007 |
| DE | 102010017610 A2 | 3/2011 |
| EP | 1367299 A2 | 12/2003 |
| EP | 3122512 A1 | 2/2017 |
| GB | 990553 A | 4/1965 |
| GB | 2286231 A | 8/1995 |
| GB | 2434621 A | 8/2007 |
| GB | 2435499 B | 1/2008 |
| GB | 2445501 A | 7/2008 |
| GB | 2471365 A | 12/2010 |
| IT | 1401730 B1 | 8/2013 |
| WO | 02/08618 A1 | 1/2002 |
| WO | 2015/147903 A1 | 10/2015 |

OTHER PUBLICATIONS

"Timkin Products-Bearings," vol. 1, Issue 6; entitled "Why Oscillate or Rotate a Bearing", 2 pages, [http://www.timken.com/products/bearings/techtips/tip6.asp].

Timkin Tech Tips: Promoting Safe, Proper Bearing Handling Practices for the Heavy-Duty Market; "Preload in Wheel Bearings" vol. 6, Issue 3, 2 pages, [http://www.Timkin.com/products/bearings/techtipsPDFs/Vol6No3.pdf#search='Bearing%20Preloadl.

"Forming and Shaping Processes Compaction and Sintering (Pulvepresning)," Copyright Institut for Precesteknik Danmarks Tekniske Universitet 1996, (http://www.ipt.dtusdk/-ap/ingpro/forming/ppm/htm).

Stemco, Pro-Torq, An Axle Spindle Nut System for Today's Fleets. Mar. 2003; download from http://www.stemco.com, pp. 38-41.

Stemco, Pro-Torq, An Axle Spindle Nut System for Today's Fleets. Mar. 2003; download from http://www.stemco.com, pp. 57-64.

What is Powder Metallurgy? Dec. 2004, 2 pages. (https://www.mpif.org/technology/whatis.html).5011306.

Stemco, Quick Reference Catalog 572-0011 Rev. Date Apr. 2010.

Stemco—Pro-Torq, Axle Spindle Nuts, An Axle Spindle Nut System for Today's Commercial Fleets (http://www.stemco.com/product/pro-torz-axle-spindle-nuts/.

"STEMCO Pro-Torq(R) 571-2970," Copyright 2005 Stemco Lp, 2 pages.

Rode, U.S. Appl. No. 15/671,604, filed Aug. 8, 2017.
Rode, U.S. Appl. No. 16/025,293, filed Jul. 2, 2018.
Rode, U.S. Appl. No. 15/482,389, filed Apr. 7, 2017.
Rode, U.S. Appl. No. 15/482,395, filed Apr. 7, 2017.
Rode, U.S. Appl. No. 15/482,413, filed Apr. 7, 2017.
Rode, U.S. Appl. No. 15/813,889, filed Nov. 15, 2017.
Rode, U.S. Appl. No. 15/928,911, filed Mar. 22, 2018.
Rode, U.S. Appl. No. 16/058,654, filed Aug. 8, 2018.

PCT/ISA/220—Notification of Transmittal of the International Search Report and the Written Opinion of the International Searching Authority, or the Declaration, mailed Jul. 30, 2018, for corresponding PCT International Application No. PCT/US2018/026525.

PCT/ISA/210—International Search Report, dated Jul. 30, 2018, for corresponding PCT International Application No. PCT/US2018/026525.

PCT/ISA/237—Written Opinion of the International Searching Authority, mailed Jul. 30, 2018, for corresponding PCT International Application No. PCT/US2018/026525.

* cited by examiner

SYSTEMS AND METHODS FOR PRELOADING A BEARING

CROSS-REFERENCE TO RELATED APPLICATION

This application is a Continuation of U.S. Ser. No. 16/706,024, filed on Dec. 6, 2019, entitled "Systems and Methods for Preloading a Bearing", which is a Continuation of U.S. Ser. No. 15/975,402, filed on May 9, 2018, entitled "Systems and Methods for Preloading a Bearing", which is Continuation of U.S. Ser. No. 15/661,808, filed on Jul. 27, 2017, entitled "Systems and Methods for Preloading a Bearing", which is a divisional of U.S. Ser. No. 15/071,753, filed on Mar. 16, 2016, entitled "Systems and Methods for Preloading a Bearing", now U.S. Pat. No. 9,764,453 issued on Sep. 19, 2017. The entire disclosures of the indicated patent applications are incorporated herein by reference.

This application is related to U.S. Ser. No. 12/492,826 filed on Jun. 26, 2009, entitled "Systems and Methods for Preloading a Bearing and Aligning a Lock Nut", now U.S. Pat. No. 8,316,530 issued on Nov. 27, 2012, the entire disclosure of which is incorporated herein by reference.

This application also relates to U.S. Ser. No. 13/683,571, filed on Nov. 21, 2012, entitled "Methods for Preloading a Bearing and Aligning a Lock Nut", now U.S. Pat. No. 8,650,752 issued on Feb. 18, 2014, the entire disclosure of which is incorporated herein by reference.

This application also relates to U.S. Ser. No. 14/160,045, filed on Jan. 21, 2015, entitled "Systems and Methods for Preloading a Bearing and Aligning a Lock Nut", now U.S. Pat. No. 8,904,646 issued on Dec. 9, 2014, the entire disclosure of which is incorporated herein by reference.

This application also relates to U.S. application Ser. No. 11/341,948, filed Jan. 27, 2006, and titled "Method and Apparatus for Preloading a Bearing", issued as U.S. Pat. No. 7,559,135 on Jul. 14, 2009, the entire disclosure of which is incorporated herein by reference.

This application also relates to U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, the entire disclosure of which is incorporated herein by reference.

This application also relates to U.S. Ser. No. 12/033,548, filed on Feb. 19, 2008, entitled "Axle Nut", now U.S. Pat. No. 8,961,090 issued on Feb. 24, 2015, the entire disclosure of which is incorporated herein by reference.

This application also relates to U.S. Ser. No. 12/492,926, filed Jun. 26, 2009, entitled "Methods for Preloading a Bearing", now U.S. Pat. No. 8,359,733 issued on Jan. 29, 2013, the entire disclosure of which is incorporated herein by reference.

This application also relates to U.S. Ser. No. 14/305,830, filed Jun. 16, 2014, entitled "Lock Nut System", now U.S. Pat. No. 9,200,673 issued Dec. 1, 2015, the entire disclosure of which is incorporated herein by reference.

This application also relates to U.S. Ser. No. 14/305,673, filed Jun. 16, 2014, entitled "Method, Apparatus, and Nut for Preloading A Bearing", now U.S. Pat. No. 9,200,672 issued Dec. 1, 2015, the entire disclosure of which is incorporated herein by reference.

This application also relates to U.S. Ser. No. 14/814,086, filed Jul. 30, 2015, entitled "Apparatus for Preloading A Bearing", now U.S. Pat. No. 9,618,049 issued Apr. 11, 2017, the entire disclosure of which is incorporated herein by reference.

This application also relates to U.S. Ser. No. 14/852,100, filed Sep. 11, 2015, entitled "Method, Apparatus, and Nut for Bearing", now U.S. Pat. No. 9,651,094 issued May 16, 2017, the entire disclosure of which is incorporated herein by reference.

This application also relates to U.S. Ser. No. 14/952,663, filed Nov. 25, 2015, entitled "Method, Apparatus, and Nut for Bearing", now U.S. Pat. No. 9,574,612 issued Feb. 21, 2017, the entire disclosure of which is incorporated herein by reference.

This application also relates to U.S. Ser. No. 15/441,520, filed Feb. 24, 2017, entitled "Method for Preloading a Bearing", now U.S. Pat. No. 9,797,411 issued Oct. 24, 2017, the entire disclosure of which is incorporated herein by reference.

This application also relates to U.S. Ser. No. 15/714,145, filed Sep. 25, 2017, entitled "Apparatus for Preloading a Bearing", published as U.S. Publication No. US 2018-0045244-A1 published on Feb. 15, 2018, the entire disclosure of which is incorporated herein by reference.

This application also relates to U.S. Ser. No. 15/928,963, filed Mar. 22, 2018, entitled "Apparatus for Preloading a Bearing", the entire disclosure of which is incorporated herein by reference.

This application is also related to U.S. Ser. No. 14/533,143, filed on Aug. 8, 2014, entitled "Systems and Methods for Preloading A Bearing and Aligning A Lock Nut", now U.S. Pat. No. 9,217,461 issued Dec. 22, 2015, the entire disclosure of which is incorporated by reference);

This application also relates to U.S. Ser. No. 15/071,570 filed Mar. 16, 2017, entitled "Systems and Methods for Preloading a Bearing and Aligning a Lock Nut", now U.S. Pat. No. 9,908,223 issued Mar. 6, 2018, the entire disclosure of which is incorporated herein by reference.

This application also relates to U.S. Ser. No. 15/885,988 filed Feb. 1, 2018, entitled "Systems and Methods for Preloading a Bearing and Aligning a Lock Nut", the entire disclosure of which is incorporated herein by reference.

This application also relates to U.S. Ser. No. 15/071,584, filed Mar. 16, 2016, entitled "Systems and Methods for Preloading a Bearing", now U.S. Pat. No. 9,599,164 issued on Mar. 21, 2017, the entire disclosure of which is incorporated herein by reference.

This application also relates to U.S. Ser. No. 29/558,261, filed Mar. 16, 2016, entitled "Retaining Ring Pliers", now U.S. Design Patent No. D 789,169 issued Jun. 14, 2017, the entire disclosure of which is incorporated herein by reference.

This application also relates to U.S. Ser. No. 15/416,683, filed Jan. 26, 2017, entitled "Systems and Methods for Preloading a Bearing", published as U.S. Publication No. US-2017-0268572-A1 on Sep. 21, 2017, the entire disclosure of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

Thus, a need exists for providing accurate and repeatable procedures and devices for providing and adjusting bearing preload and for adjusting lock nut systems configured to retain preloaded bearings.

SUMMARY OF THE INVENTION

The present provides, in a first aspect a system for providing a load on a bearing mounted to a shaft which includes an attaching member releasably connectable to the shaft and a press mechanism in fluid communication with a source of fluid and configured to provide a compressive load to the bearing. The press mechanism includes a switch having a base and a piston in communication with the fluid such that an increase in a pressure of the fluid results in the piston extending upwardly from the base and a decrease in the pressure of the fluid results in the piston retracting toward the base. The switch includes a first lower proximity sensor and a second higher proximity sensor. The piston is configured to extend upwardly from the base past the first lower proximity sensor and to trip the second higher proximity sensor. The switch is configured to control the increase in the pressure in response to the piston tripping the higher proximity sensor.

The present invention provides in a second aspect, a method for use in providing a load on a bearing mounted to a shaft which includes mounting an attaching mechanism to an end of the shaft and coupling the press mechanism to the attaching member with the press mechanism configured to provide a compressive load to the bearing. The press mechanism is coupled to a source of fluid and a pressure of the fluid is increased from the source to the press mechanism to provide a compressive load to the bearing. The increase in the pressure causes a piston of a switch of the press mechanism to extend upwardly from a base of the switch to trip a second higher proximity sensor of the switch. The switch controls the pressure of the fluid to control the load on the bearing in response to the piston tripping the higher proximity sensor.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, system and methods for adjusting bearings mounted on a shaft and aligning lock nuts for retaining such bearings are provided.

Figure 1:
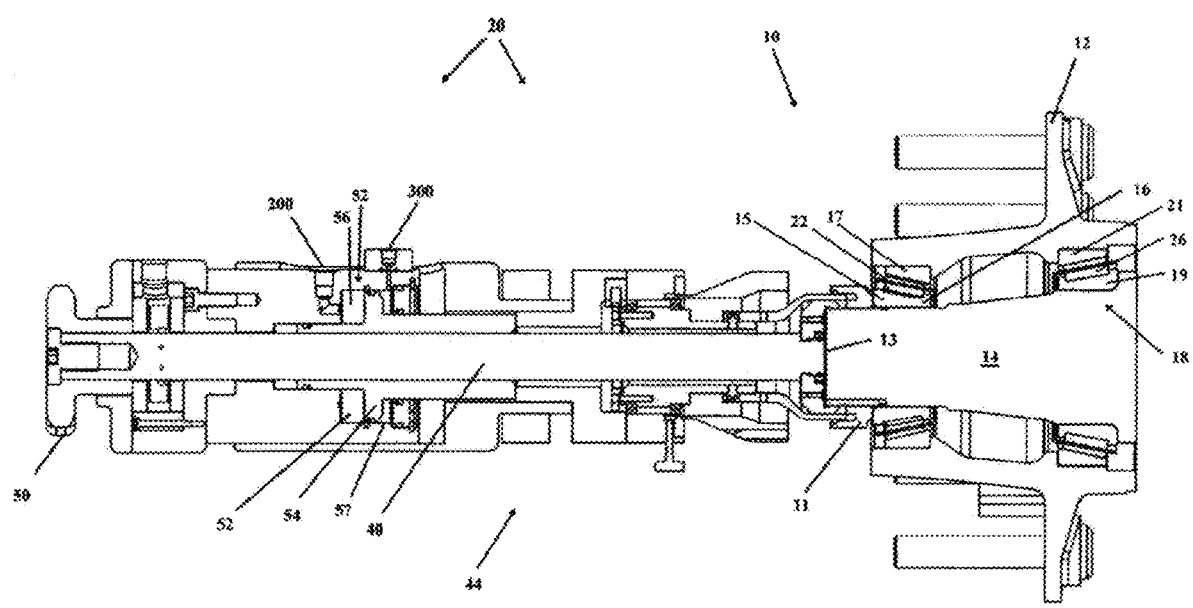
FIG. 1 is a right side elevation view, partially in cross section, of wheel hub assembly engaging a bearing preload apparatus according to one aspect of the invention.

In an exemplary embodiment depicted in FIG. 1, a wheel hub assembly 10 engages a bearing preload apparatus 20. Some of a section of the hardware has been removed to reveal inner structure to facilitate disclosure of the invention. For the sake of illustration, the wheel assembly that would typically be mounted to wheel hub assembly 10 is omitted in these figures.

Wheel hub assembly 10 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: powertrains, transmissions, machine components, on-and off-road vehicles, aircraft wheels, marine drives, spacecraft, conveyor rolls, and windmills, among others. According to aspects of the present invention, preload apparatus 20 may be used in these and any other assembly for which bearing preload and/or endplay is desired, for example, any assembly that utilizes thrust and radial load carrying bearings that are indirectly mounted.

As shown in FIG. 1-4, for example, wheel hub assembly 10 includes a wheel hub or, simply, a hub 12, a threaded shaft, axle, or spindle 14. As is typical, spindle 14 is mounted on two antifriction bearings and spindle 14 includes an exposed end 13, which is typically threaded. Spindle 14 typically includes a retaining nut 11 threaded to exposed end 13.

Figure 2:
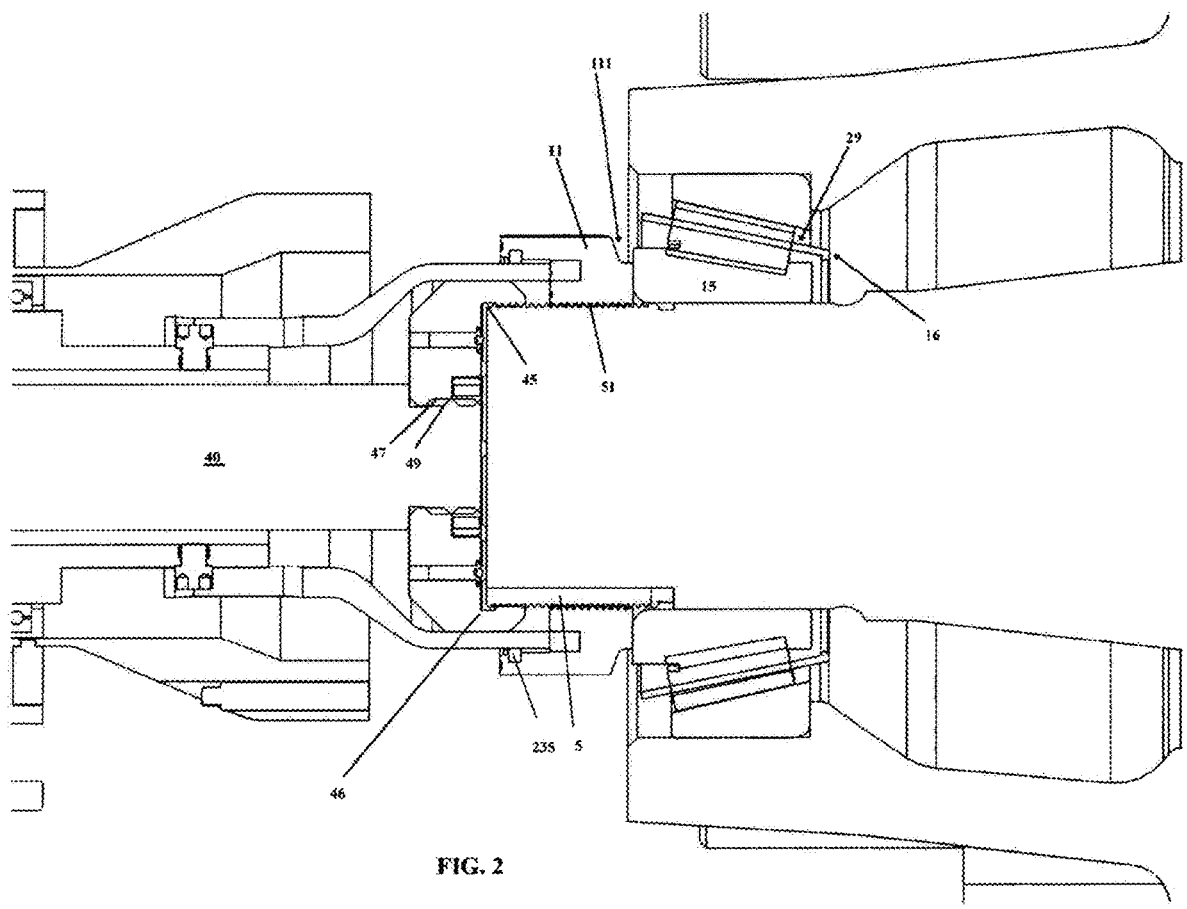
FIG. 2 is a close up view of a portion of FIG. 1.
Figure 3:
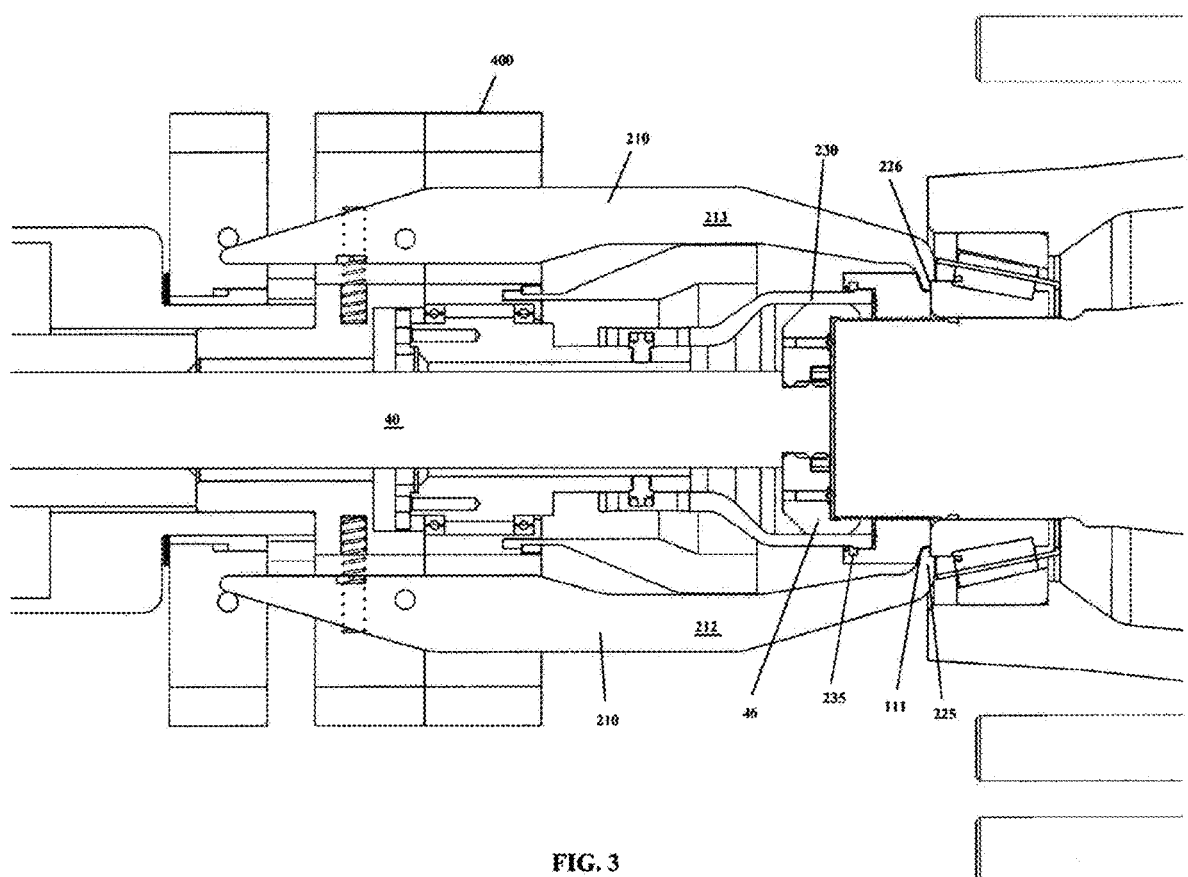
FIG. 3 is a top plan view, partially in cross section of a portion of the assembly shown in FIG. 1.
Figure 4:
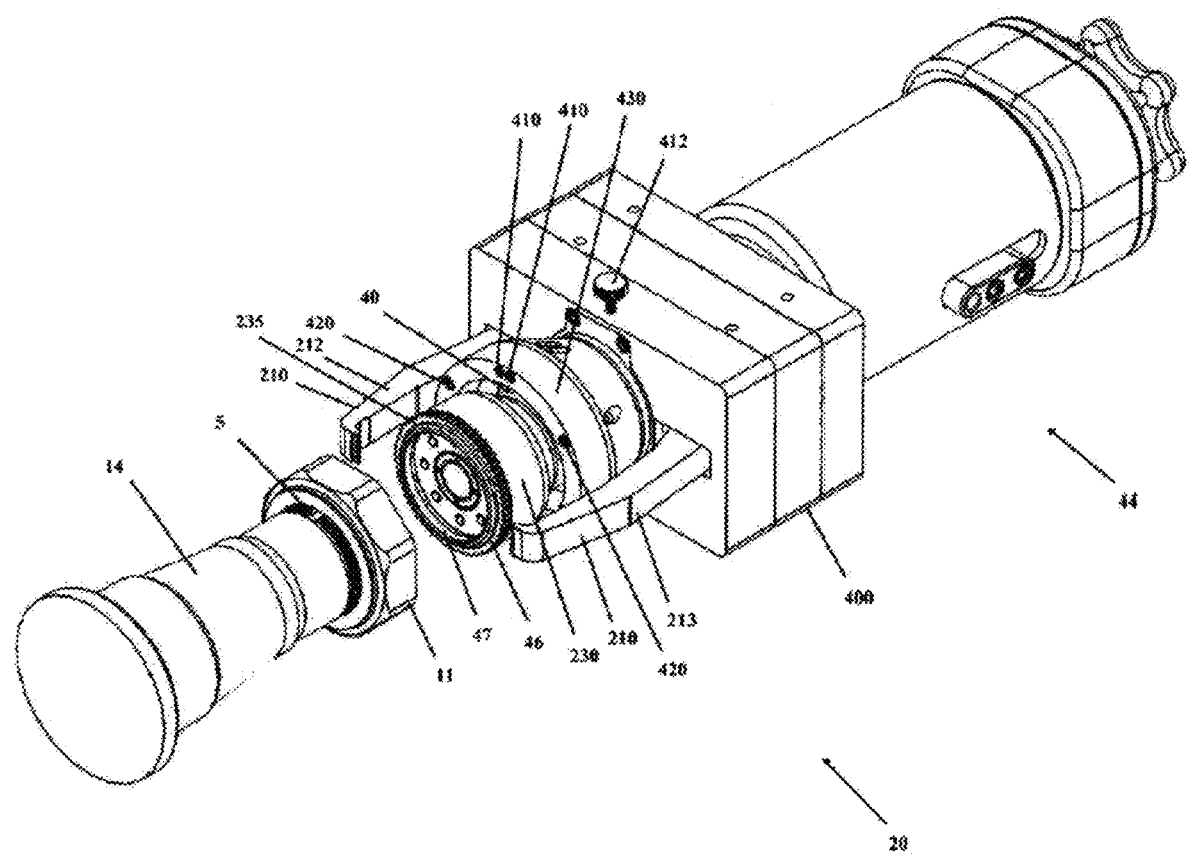
FIG. 4 is an exploded perspective view of the assembly of FIG. 1 with portions of the wheel hub assembly removed.

As shown in FIGS. 1-3, as is typical of bearings, an outboard bearing 16 includes an inner race (or cone) 15, an outer race (or cup) 17, a plurality of rollers 22, and a roller cage. Similarly, an inboard bearing 18 includes an inner race (or cone) 19, an outer race (or cup) 21, a plurality of rollers 26, and roller cage. As shown in FIG. 2, outboard bearing 16 is positioned, for example, by an interference fit, into an annular cavity 29. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 1-8, for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In the conventional art, retaining nut 11 typically is used to secure a wheel (not shown) or hub assembly to a non-rotating axle or spindle 14. However, in aspects of the present invention, retaining nut 11 may be useful in varying the preload and/or endplay of bearing 16. Though bearing 16 is illustrated as a tapered roller bearing, aspects of the invention may be applied to other types of antifriction bearings for which it is desirable to provide preload and/or endplay, for example, spherical roller bearings, deep groove ball bearings, and the like.

Figure 8:
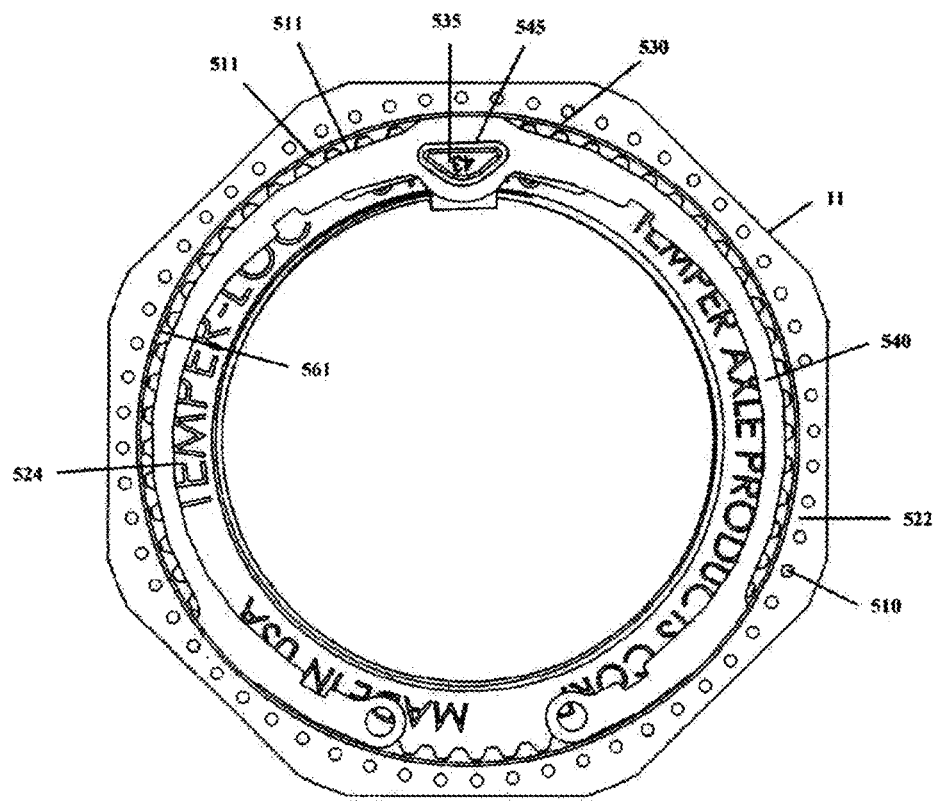
FIG. 8 is an elevational view of a lock nut system which includes a lock nut having a keeper and a keeper retaining member engaged with the nut according to an aspect of the present invention.
Figure 9:
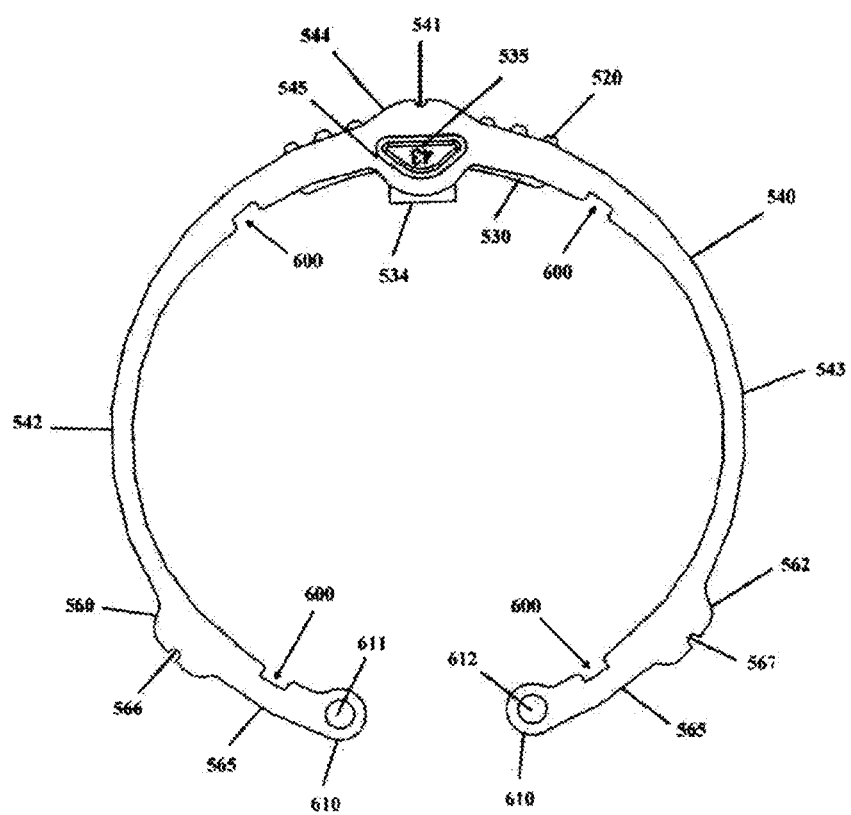
FIG. 9 is an elevational view of the keeper retaining member of FIG. 8.

As depicted in FIGS. 8-9, a keeper 530 is engageable with retaining nut 11 and is connected to a keeper retaining member 540. A projection 535 of keeper 530 extends through an opening 545 in retaining member 540 when connected. Projection 535 extends substantially perpendicular to a plane of retaining member 540. Projection 535 may be deformed by pressure applied on a top thereof (i.e. in a direction substantially perpendicular to the plane of retaining member 540) to connect retaining member 540 with keeper 530 similar to the way a rivet is utilized, as will be understood by those skilled in the art. Keeper 530 and retaining member 540 engage retaining nut 11. For example, keeper 530 includes keeper teeth 520 which are configured to engage engaging teeth 511 of retaining nut 11. Keeper 530 may also include an engaging member 534 which protrudes radially inwardly relative to retaining nut 11 to engage a shaft slot 5 (FIGS. 4-5), keyway, groove or other engaging portion of a shaft (e.g., spindle 14). Thus, engaging member 534 may inhibit movement of keeper 530 relative to a shaft (e.g., spindle 14) and the engagement of engaging teeth 511 with keeper teeth 520 may inhibit movement of keeper 530 relative to retaining nut 11. Accordingly, movement of retaining nut 11 relative to the shaft is prevented or reduced. Keeper 530 and/or nut 11 may be molded or formed of powdered metal, for example.

Keeper retaining member 540 may engage a slot 561 of retaining nut 11. For example, a first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 532 are engaged with engaging teeth 511. Further, retaining member 540 provides resistance in an axial direction relative to retaining nut 11 thereby inhibiting movement of keeper 530 axially away from a shoulder 524 toward an outer surface 522.

Retaining member 540 may be elastically deformable to allow it to be received in slot 561. For example, first leg 542 and second leg 543 may be deformed (e.g., in a direction substantially perpendicular to the axis of retaining nut 11) toward one another prior to being inserted axially past outer surface 522 of retaining nut 11 to allow retaining member 540, and keeper 530 to be attached thereto. First leg 542 and second leg 543 may then be elastically returned toward slot 561. First leg 542 may also include a gripping member 568 and second leg 543 may include a second gripping member 569. The gripping members are substantially parallel to one another and are aligned at about 90 degrees from a plane of retaining member 540. A user may move the legs (i.e., first leg 542 and second leg 543) toward one another as described above to allow the retaining member to be received in slot 561. In one example, a user may use a tool (e.g., a type of pliers, such as needle nose pliers) which is inserted into openings 611 and 612 (FIG. 5) to allow the tool to grip the legs to move ends 610 toward one another thereby allowing the legs to be inserted into slot 561. In one example, tool 7 disclosed in co-owned U.S. Pat. No. 9,599,164 is usable for this purpose.

Also, first leg 542 may include a protruding portion 560 which protrudes radially relative to a rounded portion 565 of retaining member 540. Similarly, second leg 543 may include a protruding portion 562. Protruding portion 560 and protruding portion 562 may extend into slot 561 to engage retaining member 540 with slot 561. Further, protruding portion 560 may include a groove 566 and protruding portion 562 may include a groove 567. For example, retaining member 540 may be formed of stamped sheet metal, and may have a thickness in a range between 0.040-0.050 inches, as will be understood by those skilled in the art. Alternatively, retaining member 540 could be formed of other materials (e.g., powdered metal) and/or formed in other shapes to allow retaining member 540 to be received in slot 561 and to be connected to keeper 540 via projection 535. Further, keeper 530 may be formed or molded of powdered metal, for example. Alternatively, keeper 530 and retaining member 540 could be formed integral or monolithic relative to one another.

Further, keeper 530 and/or nut 11 may be fabricated from any one or more of the structural metals, for example, carbon steel or stainless steel. Nut 11 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 11 may also be surface hardened for example, induction hardened, carburized, or nitrided, among other surface hardening methods; in one aspect, the exposed surfaces on end 241 of nut 220 may be hardened, for example, induction hardened.

Returning to FIGS. 1-5, preload apparatus 20 includes an attaching mechanism, such as a shaft or rod 40 engageable with spindle 14 by a collar 46, and a press mechanism 44 for providing a compressive load to bearing 16. In addition, aspects of the invention provide means for monitoring the preload on the bearings to, for example, ensure that the desired preload is provided, in contrast to the unreliable and often inaccurate assumed preloading of the prior art.

Rod 40 may be configured to attach to exposed end 13 of shaft 14, for example, by collar 46, though other attachment means may be used. Press mechanism 44 may include an adjustment handle 50 which may be connected to rod 40 to facilitate rotation of rod 40 and/or collar 46 to connect press mechanism 44 to shaft 14. Such connection may also be performed by a servo motor or other mechanism for rotating rod 40 and/or collar 46 to connect press mechanism 44 to shaft 14.

Press mechanism 44 may provide a compression force via a nut as described in co-owned U.S. Pat. No. 8,316,520 relative to a nut 48 depicted therein or via a hydraulic, pneumatic or other means of providing such a force.

As shown in FIGS. 3-7, press mechanism 44 includes loading arms 210. A compressive load from press mechanism 44 is transmitted to bearing 16, and to bearing 18, by loading arms 210. Further, loading arms 210 work in conjunction with retaining nut 11 to provide a load to outboard bearing 16 (e.g., an inner race 15 thereof). Retaining nut 11 may have a recess that exposes the surface of inner race 15 and permits contact by, for example, loading arms 210. For example, as depicted in FIGS. 1-7, nut 11 may have a bottom curve or recessed portion 111 such that a bottom end of nut 11 has a smaller diameter than the remainder thereof. Loading arms 210 may thus transmit the compressive load from press mechanism 44 (i.e., around nut 11) to bearing 16. In an unillustrated example, bearing 16 could be exposed thereby allowing press mechanism 44 to be used with a conventional axle nut, as shown for example in FIG. 3 of co-owned application U.S. Pat. No. 7,389,579. However, when bearing 16 would be concealed by such a conventional axle nut, retaining nut 11 may be used instead thereof according to aspects of the invention.

As depicted in FIGS. 3-7, for example, loading arms 210 extend from a base 400 and include a first arm 212 and a second arm 213. In this aspect of the invention, arms 210 are adapted to transmit a load from press mechanism 44 to the bearing 16. In one aspect, arms 210 may be moveable or deflectable to facilitate assembly of arms 210 into engagement with bearing 16. For example, arms 210 may include a modification to arms 212 and 213 that permits arms 212 and 213 to deflect to avoid interference with nut 11. In an example, arms 210 may be pivotally mounted to base 400 or another portion of press mechanism 44 to allow lateral movement of the arms such that the arms may engage bearing 16. Arms 210 may include projections 225, 226, respectively, for example, arcuate projections adapted to engage the arcuate shape of bearing 16 (e.g., an inner race thereof) as described previously relative to extensions 212, 213 of co-owned U.S. Pat. No. 8,650,757, issued on Feb. 18, 2014, and titled "Methods for Preloading a Bearing and Aligning a Lock Nut". Arcuate projections 225, 226 may be radiused to provide the same curvature of bearing 16, for example, a radius of between about 1¼ inches and about 3 inches. The shape of arms 210 including projections 225, 226 may ensure that the compressive load applied by press mechanism 44 is transmitted to bearing 16 and not borne by nut 11. Minimizing or preventing contact between extensions 212, 213 and nut 11 also permits nut 11 to be freely rotated without contact with extensions 212, 213.

Figure 15:
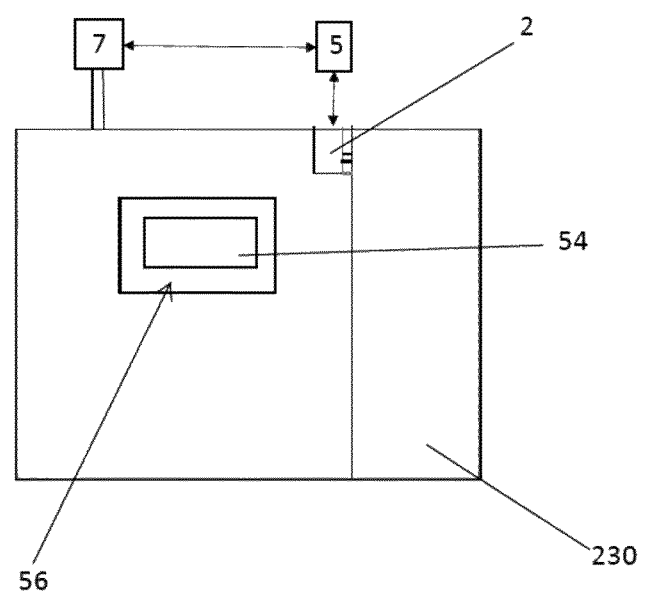
FIG. 15 is a schematic block diagram representation of portions of the assembly of FIG. 1.

Press mechanism 44 may include a wrench 230 having teeth 235 engageable with teeth 511 of nut 11 to allow a rotation of nut 11 via a controller (e.g., a controller 5, FIG. 15) controlling a rotation of nut 230. Wrench 230 may surround collar 46 and be extendable away from base 400 toward nut 11 and retractable in an opposite direction. Teeth 235 may engage teeth 511 when wrench 230 is extended to contact nut 11.

Figure 10:
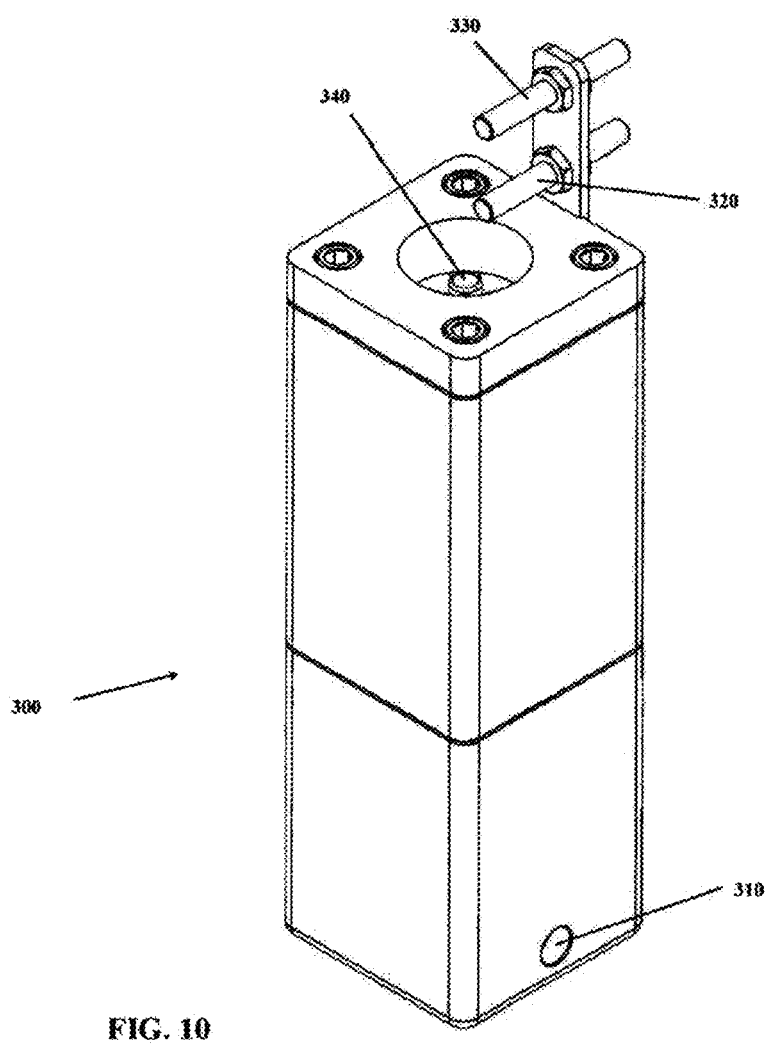
FIG. 10 is a perspective view of a pressure buffer switch of the apparatus of FIG. 1.
Figure 11:
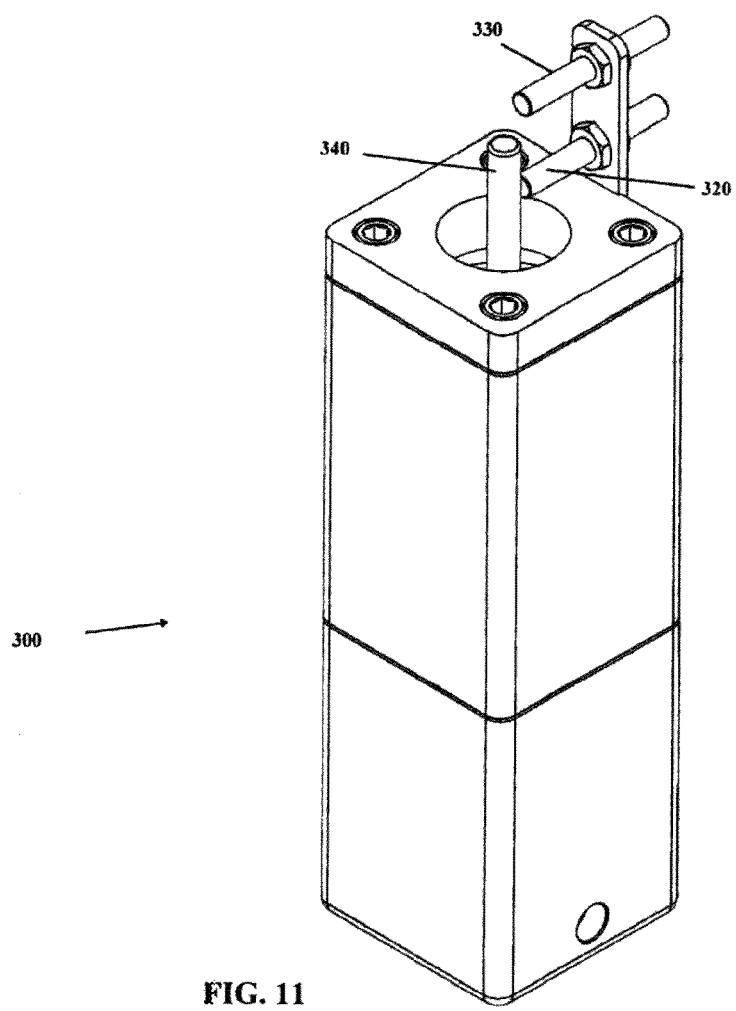
FIG. 11 is a perspective view of the switch of FIG. 10 with a piston extension extending from a cavity thereof past a first proximity sensor.
Figure 12:
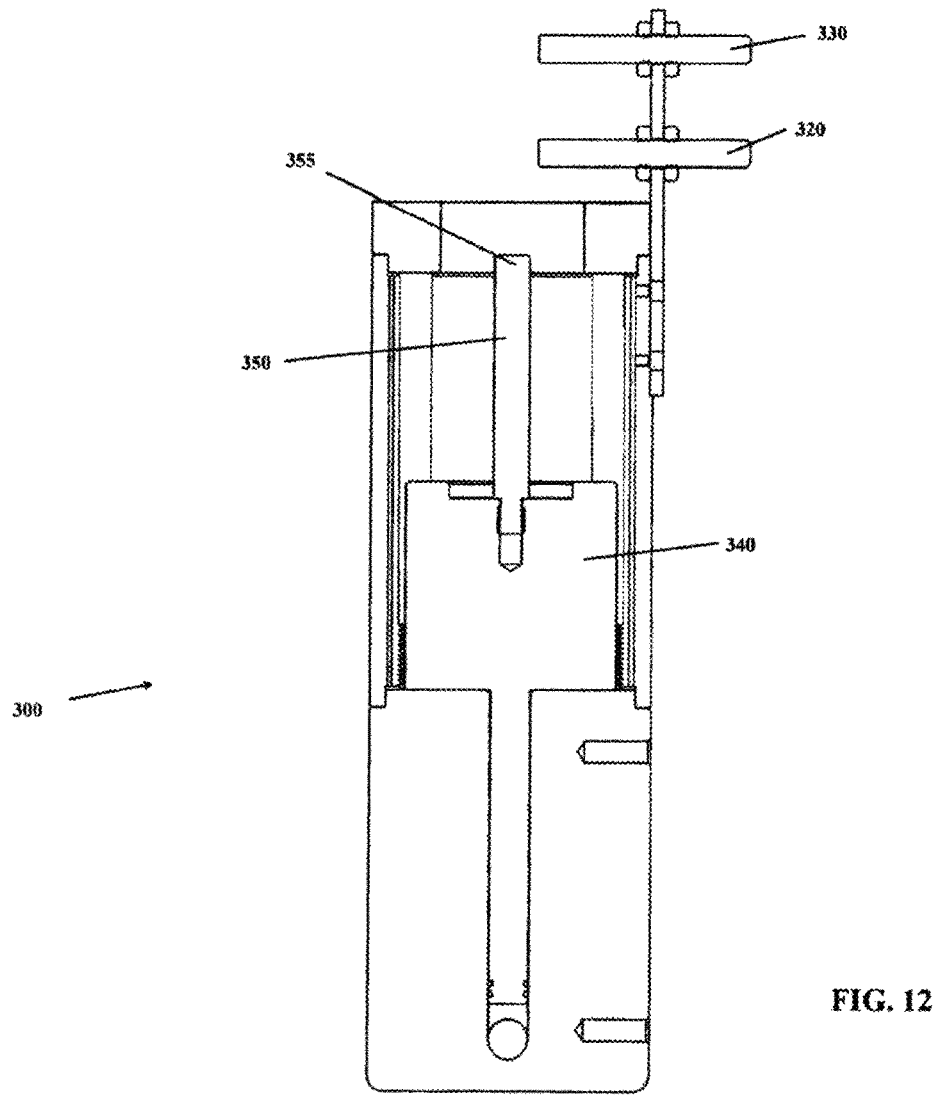
FIG. 12 is a side cross-sectional view of the switch of FIG. 10.
Figure 13:
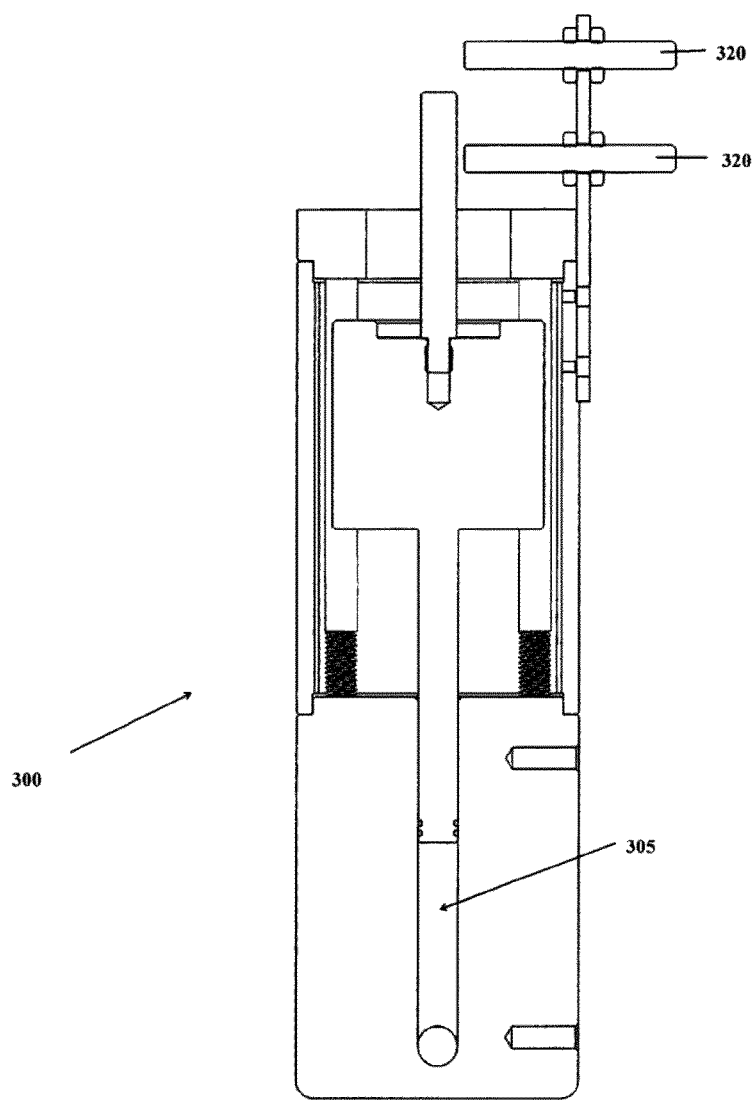
FIG. 13 is a side cross-sectional view of the switch of FIG. 11.

Although only two arms 212, 213 are illustrated in FIGS. 3 and 10-11, according to one aspect of the invention, two or more arms 212, 213 may be mounted to, or otherwise extend from, base 400 of press mechanism 44. For example, three or more extensions arms may be provided, for example, uniformly spaced about base 400 about an axis coaxial to an axis of shaft 14 and/or rod 40. In one aspect of the invention, arms 212, 213 may include spring-loaded mountings to base 400 whereby arms 212, 213 are biased into a position of engagement with race 15. Press mechanism 44 may be any apparatus that is configured to provide a compressive load (e.g., utilizing a nut) to outboard bearing 16 (e.g., an inner race thereof). Further, press mechanism 44 may include a load sensor or any means for monitoring the compressive load transferred to bearing 16. For example, the indication of the compressive load transferred by press mechanism 44 may be provided mechanically, for example, by compression springs having a known spring constant, for example, coil springs or disc springs, and a deflection indicator, for example, a dial indicator, as is known in the art. In this aspect, the dial indicator may be mounted to detect and indicate the compression of one or more springs positioned in press mechanism 44 due to the advancement of nut 48, and the compression load calculated from the deflection indicated and the known spring constant of the springs used. The load sensor may be wired to an appropriate controller or processor and display to, for example, provide a digital readout of the compressive load to the mechanic operating preload device 20. The transmission of signals from the sensor may also be practiced wirelessly, for example, by means of an RF signal. This aspect of the invention may also provide a reliable and repeatable means for monitoring the preload provided to bearing 16.

In another aspect of the invention, press mechanism 44 may include at least one fluid, for example, a gas, such as air; or a liquid, such as, water, oil, or hydraulic fluid, the pressure of which can be detected and monitored, for example, by means of a pressure gage, pressure sensor, or a mechanical indicator. In one aspect, the fluid pressure may comprise the source of compressive load on bearing 16. In such an embodiment, the fluid may be retained in a cavity for example, a deformable cavity, such as a bladder or hose, for example, an air spring; or a cavity having rigid walls and at least one moveable wall, for example, as in a cylinder and piston. In one aspect, the deformable cavity or air spring may be made of molded rubber, somewhat like an inner tube.

When air is used as the fluid, the air may be provided by conventional "shop air" at a pressure of about 100 psig. The pressure of the fluid in the deformable cavity may be monitored by means of sensor or pressure gauge, for example, a pressure gauge mounted to a nozzle inserted on the wall of the deformable or non-deformable cavity. In one aspect, a mechanical indicator may be activated, for example, a lever deflected when the desired fluid pressure in press mechanism 44 is reached advising the mechanic.

As discussed previously, press mechanism 44 and rod 40 thereof may be adapted to attach to exposed end 13 of spindle 14. Though this may be effected by many conventional means, including welding and mechanical fasteners, in the aspect of the invention shown in FIGS. 1-4, rod 40 is attached to end 13 of spindle 14 by collar 46. In the aspect shown, collar 46 is mounted to rod 40 by internal threads 47 in collar 46 that thread onto external threads 49 on rod 40. Collar 46 also includes a second set of internal threads 45 that engage external threads 51 on spindle 14. In one aspect, only 2 or 3 external threads 51 need be engaged by collar 46. According to one aspect, multiple collars 46 having varying diameters may be provided to accommodate varying diameters of spindle 14. Each of these collars 46 may be adapted to engage external threads 49 on rod 40.

Rod 40, housing 42, collar 46, arms 50, housing 52, piston 54, and housing 42 may be fabricated from any conventional structural metal, for example, iron, steel, stainless steel, aluminum, titanium, nickel, magnesium, brass, or bronze, among others.

In one aspect of the invention, preload apparatus 20 may be used to apply and monitor a preload to outboard bearing 16. In a typical procedure, a wheel (not shown) may be dismounted from hub assembly 10, for example, which was mounted to studs on hub 12, as exemplified by stud 100 in FIGS. 1-3. Nut 11 may be loosened or hand tightened prior to mounting apparatus 20, though any light load on nut 11 will typically be relieved with application of tension to spindle 14 by means of rod 40.

For example, a torque wrench and socket may be utilized to torque nut 11 and seat the bearings. The nut may then be tightened to a "hand tight" position followed by loosening of the nut by backing it off about ¼ turn. Alternatively, such tightening and loosening may be done using servo controlled wrench tools (e.g., wrench 230) which perform such tasks in response to a command by a user or which may be automatically performed in response to a set of instructions programmed and stored in the controller or a second controller or computer storage coupled to the controller.

Figure 5:
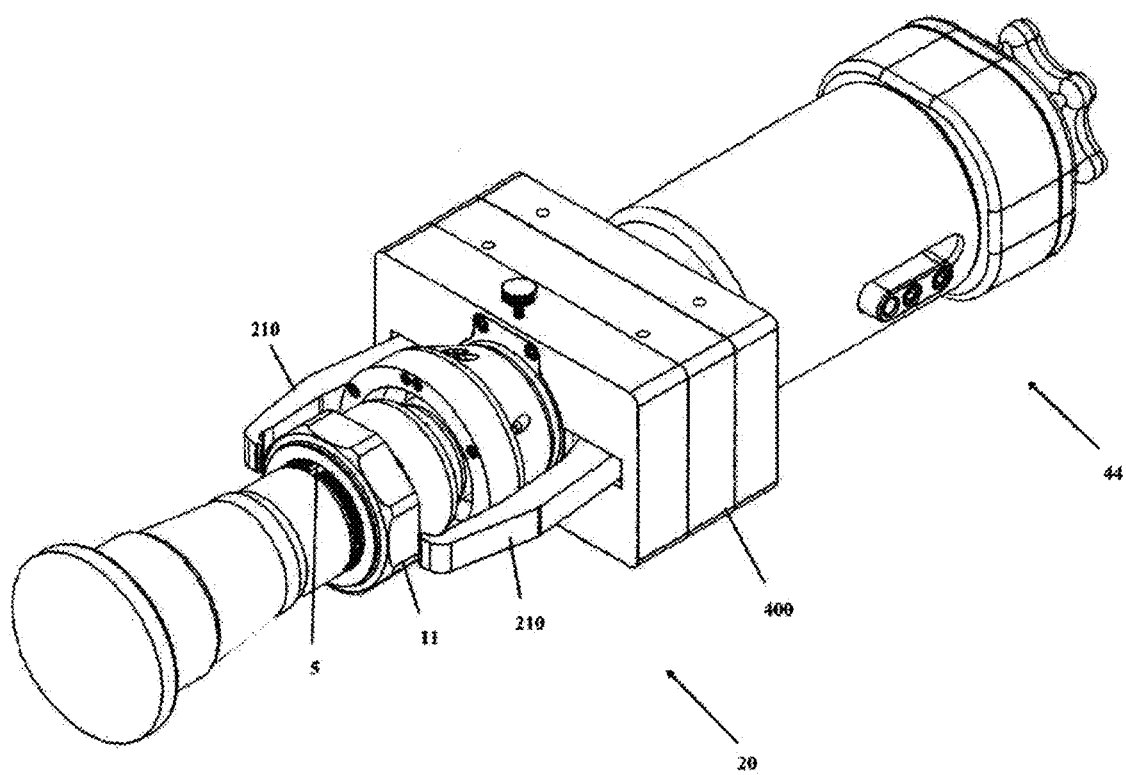
FIG. 5 is perspective view of the assembly of FIG. 1 with portions of the wheel hub assembly removed.
Figure 6:
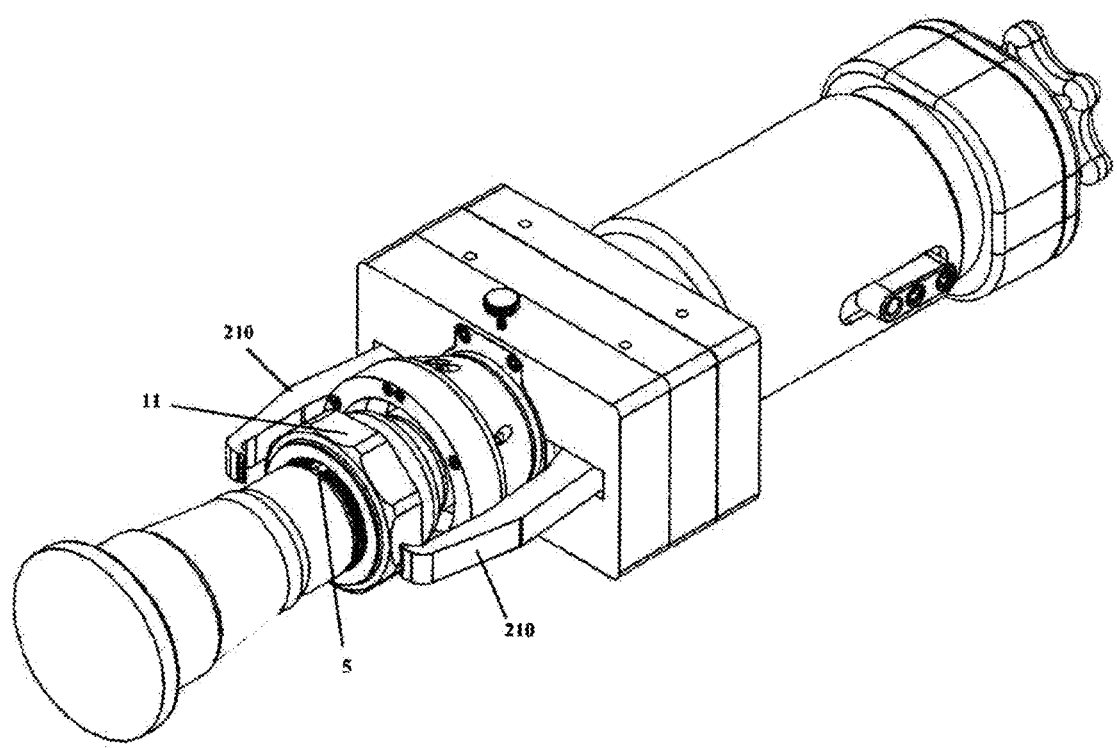
FIG. 6 is a perspective view of the apparatus of FIG. 5 with extending arms of the preload apparatus extended relative to the depiction in FIG. 5.
Figure 7:
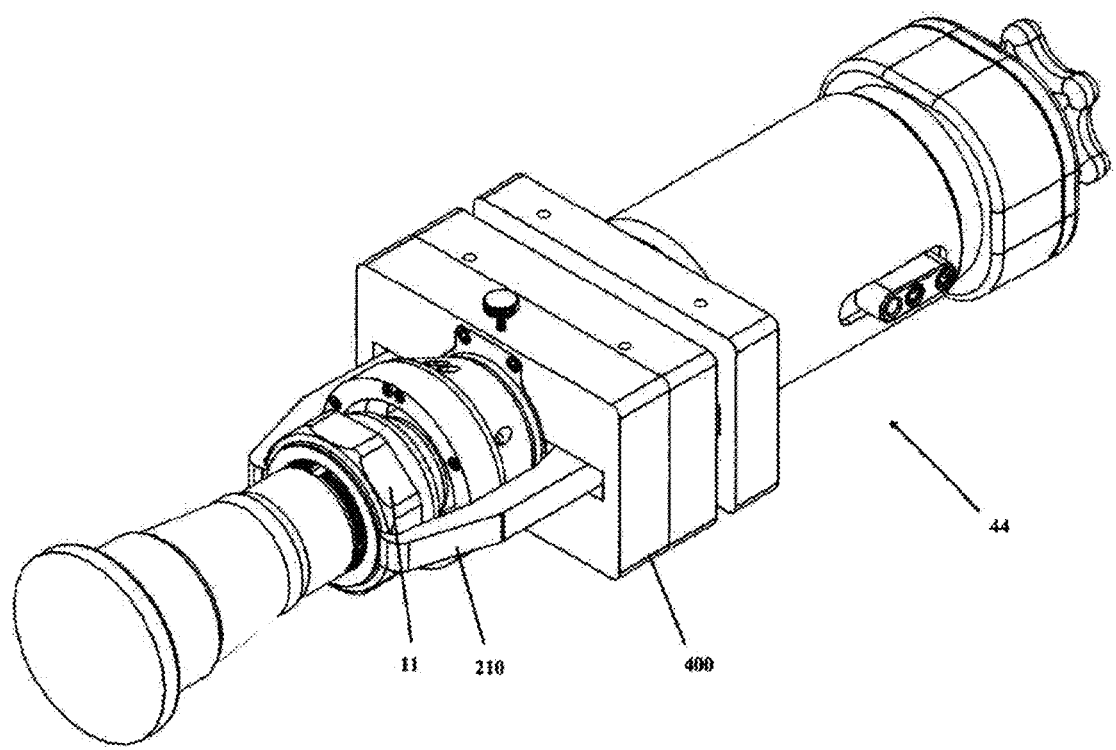
FIG. 7 is a perspective view of the apparatus of FIG. 6 with the extending arms extended further around a lock nut to engage a bearing.

Apparatus 20 may then be mounted to hub assembly 10 by attaching rod 40 to spindle 14 by means of collar 46. Arms 210 may then be automatically advanced by press mechanism 44 such that the arms are brought into contact with bearing 16 (e.g., an inner race thereof) as depicted in FIGS. 5-7 which a movement of arms 210 toward bearing 16 and around nut 11. FIG. 7 shows a same position of arms 210 as FIG. 3. In one example, press mechanism may then apply 4000 lbs force to bearings.

Such force may be generated and transmitted by press mechanism 44 using any of various mechanisms including those described in co-owned U.S. Pat. No. 8,316,530 relative to press mechanism 44. In one example, the loading of bearing 16 may be initiated by advancing, that is tightening, a nut (such as nut 48 described in patent '530) against housing 52 via bearing 62, for example, by means of arms 50. The buildup of pressure in cavity 56 as indicated by pressure indicator 60 may be monitored by the mechanic as described in co-owned U.S. Pat. No. 8,316,530. The nut may be tightened and loosened manually or by an electronically controlled servo wrench controlled by a controller preprogrammed or operated in real time by a user, for example.

Pressure is applied by press mechanism 44 until a target pressure is achieved. The hub assembly may be rotated at least once to provide proper seating of the rollers in bearing 16. Alternatively, the bearings could be automatically rolled utilizing a separate bearing rolling mechanism not described herein.

A desired preload may then be provided (e.g., automatically controlled by the controller) by press mechanism 44 to the bearings. The controller may cause a servo motor (e.g., a motor 2, FIG. 15) to actuate wrench tools (e.g., wrench 230) and torque the nut (e.g., nut 11) to "finger tight" or a wrench 230 could be controlled by a controller to provide such a preload. If endplay is desired, a servo motor (e.g., motor 2 coupled to wrench 230 or a separate servo wrench) may back the nut off to a desired endplay setting. Upon completion of the preloading, apparatus 20 may be removed from wheel hub assembly 10 and, keeper 530 and retaining member 540 may be engaged with retaining nut 11 and spindle 14 such that keeper teeth 520 engage teeth 511 of nut 11 and engaging member 534 of keeper 530 engage shaft slot 5 of spindle 14.

The preloading of the bearings as described above is advantageous relative to endplay adjustment but was rarely recommended prior to the present invention due to the difficulty of creating and verifying a correct preload site. A load sensor such as a pressure indicator or gauge (not shown) may be used along with the selective positioning of retaining nut 11 on spindle 14 (e.g., using locating laser beams produced by locating optical sending units and markings 510; or wrench controlled by a controller described in co-owned U.S. Pat. No. 9,908,223 issued Mar. 6, 2018) provide for a repeatable correct and accurate preload setting.

In another example, press mechanism 44 may apply pressure by fluid pressure to provide the compressive load to bearing 16. In this aspect of the invention, the compressive force provided by the nut described relative to patent '530 may be replaced by fluid pressure provided to press mechanism 44. For example, as depicted in FIGS. 1-4, press mechanism 44 includes a housing 52 and a movable piston 54 mounted for axial movement in housing 52. In this aspect of the invention, an internal cavity 56 is provided in housing 52. Internal cavity 56 is at least partially filled, for example, substantially completely filled, with a fluid, for example, a gas, air, oil, water, and the like, that produces a hydrostatic pressure when fluid pressure is provided to internal cavity 56 receiving piston 54 via a pump (e.g., a pump 7, FIG. 15), pressurized shop gas, or otherwise. Such pressure may cause movement of piston 54 which may be mechanically coupled to arms 210 to provide the load to bearing 16. A reduction in such pressure may cause a retraction of piston 54 and/or a reduction in the load.

Piston 54 may be provided with one or more seals (not shown), for example, one or more wiper seals, to minimize or prevent the leakage of fluid from housing 52. Also, cavity 56 bounded by housing 52 may provide clearance for the displacement of piston 54 therein.

In one aspect, the fluid pressure (e.g., to cavity 56 of housing 52 of press mechanism 44) may be provided by a conduit or hose (e.g., a hose 9). The hose may supply fluid, for example, hydraulic fluid, from a pressurized supply, for example, a pump controlled by a controller. The fluid supplied to the hose may vary from 500 to 3000 psig.

Such a press mechanism applying pressure by fluid pressure may be used to automatically regulate the compressive load on bearing 16, for example, by regulating the pressure introduced to press mechanism 44 through the hose. In one aspect, the invention may include an automatic controller, for example, a PID controller, personal computer, or PLC controller adapted to regulate the pressure in the hose. For example, the predetermined preload and the parameters of the bearing being loaded may be entered into the controller and, after mounting a rod similar to rod 40, housing 42 and a press mechanism to bearing 16 (e.g., an inner race thereof), the controller may automatically ramp up the fluid pressure to provide the desired preload or to verify an existing preload. This aspect of the invention may be suitable for production line applications, among others.

In one aspect, the fluid provided by the hose may be provided by a pressure increasing device, for example, a pressure intensifier, that is, a device that converts one pressure to a higher pressure. For example, the pressure-increasing device may be provided with a pressure supply of, for example, 100 psig (for instance, shop air) and increased to, for example, 2000 psig hydraulic fluid, which is then supplied to the hose. Other sources of high-pressure fluid may be provided according to aspects of the invention.

In an example, press mechanism 44 may include a switch 300 for use in controlling the load on bearing 16. Switch 300 may be in fluid communication with cavity 56 and thereby a source of fluid (e.g., via the hose described above) utilized to provide fluid pressure to apply the load to the bearing. Switch 300 may be coupled to a controller or may include a controller therein to regulate the compressive load on bearing 16, for example, by regulating the pressure (e.g., hydraulic or air) introduced into cavity 56 to drive piston 54 as described above.

As depicted in FIGS. 10-14, switch 300 may include a fluid input 310 in fluid communication with cavity 56 via a conduit (e.g., a hose), for example. Switch 300 may include a first lower sensor (e.g., a proximity sensor) 320, a second upper sensor (e.g., a proximity sensor) 330 and a switch piston 340. A fluid pressure in cavity 56 may cause fluid to flow to an interior 305 (FIG. 13) of switch 300 to cause a switch piston 340, and an extending portion 350 thereof, to rise upwardly in response to an increase in pressure in cavity 56 and to retract downwardly in response to a decrease in such pressure.

First lower sensor 320 and second upper sensor 330 may be proximity sensors that are configured to detect a presence of extending portion 350 near such sensors, such as when the extending portion approaches and/or extends past such sensors. For example, the sensors may detect the proximity of extending portion 350 by emitting an electromagnetic field or a beam of electromagnetic radiation while a receiver portion thereof detects if a change in a field has occurred or the occurrence of a reflection or return signal. Other examples include capacitive or photoelectric proximity sensors. In a further example, the sensors may be electrical contact sensors and extending portion 350 could contact each sensor to indicate a presence thereof.

The presence of first lower sensor 320 and second upper sensor 330 allows a control of an application of pressure on bearing 16. For example, as fluid flows to cavity 56 and pressure therein builds, fluid may flow and build in interior 305 of switch 300 causing switch piston 340 including extending portion 350 to rise. Sensor 320 and sensor 330 may detect a presence of extending portion 350 as the extending portions come near each particular sensor. In one example when the pressure in cavity 56 rises extending portion 350 may rise to pass sensor 320 and sensor 330, and when the pressure decreases extending portion 350 may pass the sensors or could stop between the sensors. For example, a desired pressure may be present when the extending portion is located between the sensors and a controller coupled to the sensors and a pump may control the pump to provide fluid to cavity 56 to control a load on the bearing via maintenance of extending portion 350 between sensor 320 and 330.

For example, a ratio of a weight of an entirety of switch piston 340 to a plunger end 341 may be calibrated to a certain pressure; e.g., if the plunger end were exactly 1 square inch and the weight were exactly 100 pounds, a buffering pressure may be set at 100 psi. In an example, by reducing the surface area of plunger end 341 from 1 square inch to 0.5 square inches the buffering pressure would then be at 200 psi. The buffering pressure could be set to the application. In an example, either 250 or 500 pounds of force could be held on a bearing/hub assembly. In another example, if a piston (e.g., piston 54) of a tool (e.g., press mechanism 44) had 4 square inches of surface area, 125 psi may be needed to be maintained by a Pressure Buffering Switch (e.g., switch 300), which may be accomplished by a piston weighing 125 pounds with a 1 square inch plunger (e.g., plunger end 341). In another example, a piston (e.g., piston 54) weighing 25 pounds could be combined with a plunger (e.g., plunger end 341) of 0.2 square inch.

Further, relative to press mechanism 44, an output force may be measured to calibrate frictional and other losses out of the system by adjusting a piston weight (e.g., piston 54) until a precise force output is achieved.

Figure 14:
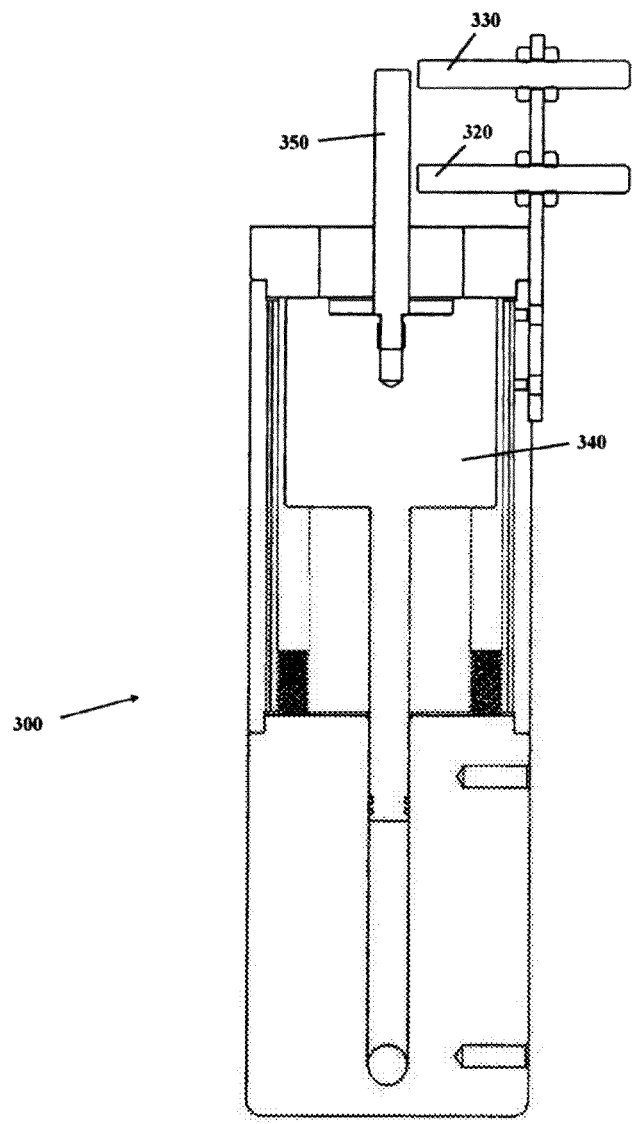
FIG. 14 is a side cross-sectional view of the switch of FIG. 13 with the piston extension extending in the proximity of a second proximity sensor.

In another example, a roll-in pressure (hydraulic or pneumatic) is applied to the bearing via fluid pressure (e.g., a pressure of 4000 lbs) being provided to piston 54 which causes a pressure in cavity 56 to rise and switch piston 340 to rise to an uppermost end of stroke as depicted in FIGS. 11 and 14, for example.

The system of pressure in cavity 56 coupled to interior 305 may be calibrated such that a desired preload on the bearing occurs when extension 350 (e.g., a top end 355 thereof) is located vertically between sensors 320 and 330. For example, a load on the bearing may be 500 lbs when top end 355 is located between the sensors. In an example, after the roll-in pressure described above is applied, the load and pressure may be reduced until top end 355 is located between sensors 320 and 330. The vertical distance between the sensors may provide a buffer switch such that if the pressure in cavity 56 and interior 305 drops to the level of sensor 320 an action may be taken. For example, upon end 355 being detected (e.g., via a proximity detector of sensor 320) in a proximity of sensor 320 then flow and the corresponding pressure to cavity 56 and interior 305 may be increased or restarted (e.g., via a pump) until end 355 is in a vicinity of sensor 330 (e.g., as detected by a proximity detector in sensor 330) after which the flow and pressure may be stopped to maintain the desired pressure, i.e., as when end 355 is between sensors 320 and 330.

When the load and pressure are at a desired condition, nut 11 may be tightened by hand or automatically as described above to "finger tight".

The pressure may then be reduced to a desired level and approaches the calibrated level of the Pressure Buffer Switch (to coincide with the "set" pressure of the unit), the upper prox switch will trip "off" letting the system know to stop the adjustment of pressure.

Although aspects of the present invention were described above with respect to their application to wheel hub assemblies, for example, truck wheel hub assemblies, it is understood that aspects of the present invention may be applied to any vehicle, machine, or component having at least one bearing. Further, although press mechanism 44 is described above as applying a compressive load to an inner race of a bearing, such load could be applied elsewhere to the bearing or wheel assembly 10 such that a frictional or other load on a retaining nut is reduced to allow rotation of a retaining nut. Such rotation may allow teeth of the nut and teeth of a keeper to be aligned with each other to allow engagement of a shaft engaging portion (e.g., engaging member 534) of the keeper with a shaft, (e.g., a shaft slot 5 thereof) to inhibit rotation of the nut relative to the shaft.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A method for use in providing a load on a bearing mounted to a shaft, the method comprising:
   mounting an attaching member to an end of the shaft;
   coupling a press mechanism to the attaching member, the press mechanism configured to provide a compressive load to the bearing;
   coupling the press mechanism to a source of fluid;
   providing a computer controller coupled to a switch having a piston and proximity sensors, the piston movable relative to the sensors in response to a change in a pressure of the fluid
   the computer controller automatically controlling a pump to regulate the pressure from the source to the press mechanism to apply the compressive load to the bearing based on a location of the piston relative to the proximity sensors.

2. The method of claim 1 wherein the controller controlling the pressure comprises the controller regulating a pressure introduced to the press mechanism through a hose to control the load applied to the bearing.

3. The method of claim 1 wherein the controller controlling the pressure comprises the controller controlling a pressure intensifier to control the pressure.

4. The method of claim 3 wherein the providing the compressive load to the bearing comprises providing the load by a plurality of extensions of the press mechanism by engaging the extensions with an inner race of the bearing.

5. The method of claim 4 further comprising the controller controlling an adjustment mechanism to move the plurality of extensions axially towards the wheel hub assembly to apply the load to the bearing.

6. The method of claim 1 further comprising the controller controlling a wrench to engage a lock nut with the shaft and the controller controlling the wrench to rotate the lock nut to a particular position to achieve a desired preload or endplay setting on the bearing.

7. The method of claim 1 wherein the controlling the pressure of the fluid comprises the controller automatically regulating the pressure of the fluid to the press mechanism through a hose.

8. The method of claim 1 wherein the controlling the pressure of the fluid comprises the controller controlling a pump to provide the fluid via a hose to a cavity of the press mechanism.

* * * * *